United States Patent [19]

Veillard

[11] Patent Number: 4,585,998

[45] Date of Patent: Apr. 29, 1986

[54] METHOD AND DEVICE FOR COHERENT DEMODULATION OF A DIGITALLY MODULATED CARRIER

[75] Inventor: Jacques Veillard, Saint Gregoire, France

[73] Assignee: Etablissement Public de Telediffusion dit, Montrouge, France

[21] Appl. No.: 651,843

[22] Filed: Sep. 18, 1984

[30] Foreign Application Priority Data

Sep. 21, 1983 [FR] France .............................. 83 15019

[51] Int. Cl.[4] ...................... H04L 27/14; H04L 27/22
[52] U.S. Cl. .................................. 329/50; 329/105;
329/122; 331/4; 331/23; 358/25; 375/120;
375/112
[58] Field of Search ................. 329/105, 50, 122, 124;
331/4, 10, 11, 17, 23, 25; 375/81, 94, 120, 112,
113; 358/25

[56] References Cited

U.S. PATENT DOCUMENTS

| | | | |
|---|---|---|---|
| 3,525,945 | 8/1970 | Puente | 329/50 |
| 4,308,503 | 12/1981 | Scott | 329/50 |
| 4,339,725 | 7/1982 | Ichiyoshi | 329/50 |

FOREIGN PATENT DOCUMENTS 2459594 1/1981 France .

*Primary Examiner*—Siegfried H. Grimm
*Attorney, Agent, or Firm*—Larson and Taylor

[57] ABSTRACT

A digitally modulated carrier modulated by phase shift keying or frequency shift keying with phase continuity, transmitted as useful bursts distributed at equal time intervals with phase continuity from each burst to the next burst. The carrier frequency is recovered by squaring the carrier for obtaining a spectrum and selecting the carrier frequency within said spectrum. Bursts at an acquisition frequency having the same frequency as the carrier, having a time duration longer than the time duration of the useful bursts and having characteristic features which are particular to said acquisition burst, are sent at times which are separated by time periods having a duration which is longer than the repetition period of the useful bursts by at least an order of magnitude. The acquisition bursts are received along with the useful bursts and squared to provide an acquisition spectrum. A frequency which is double of the carrier frequency is selected within the acquisition period by identifying the characteristic feature of the acquisition bursts.

10 Claims, 9 Drawing Figures

METHOD AND DEVICE FOR COHERENT DEMODULATION OF A DIGITALLY MODULATED CARRIER

BACKGROUND AND SUMMARY OF THE INVENTION

The invention relates to coherent demodulation of a digitally modulated carrier by phase shift or by frequency shift with continuous phase, which carrier is transmitted as bursts regularly spaced over time, with a continuity of the phase of one burst to the following one. The digital modulation by phase shift may be anyone of the types in current use: it may be especially be PSK 2-4 modulation, in which the carrier is modulated by phase jumps of 90°.

The invention finds a particularly important use in the field of radiobroadcasting by satellite using a signal which consists of time-division between an analog carrier 11 frequency modulated by the image signal during the active duration of a television line and a digital carrier 10 emitted during the blanking periods. Referring to FIG. 1, there is shown a map of this multiplex which is used in the C-MAC system as described in "Multiple sound channels in satellite broadcasting" by M. d. Windrawn, I.E.E. Proc. Vol. 129, Pt. A. No. 7, September 1982, pp. 528-531. This system enables eight high quality digital sound tracks associated with the television image to be transmitted. The characteristics of the standard system are as follows:

| Image modulation: | Frequency modulation |
|---|---|
| Modulation of the digital carrier: | PSK 2-4 |
| Instantaneous flow rate of the digital carrier: | 20.25 Mbits/s |
| Duration of a burst: | 9.97 μsec. |

In the case where synchronization is transmitted during the TV frame, the entire duration of the burst may be used for sending useful data. It is not necessary to transmit a preamble at the beginning of each burst as is conventionally done in systems with time division multiple access (TDMA).

Methods of demodulation applicable to C-MAC satellite communications are already known, particularly using the PSK 2-4 modulation at present proposed.

Among these methods, differential demodulation is at present proposed, because it is simpler to use than coherent demodulation. On the other hand, differential demodulation presents performances as regards noise inferior to those of coherent demodulation. In particular, in satellite broadcasting, differential demodulation does not permit to guarantee simultaneous recovery of the image and sound as soon as the carrier to noise ratio is less than a value which is higher than with coherent demodulation. It has been found experimentally that the interruption of service for the sound takes place for a carrier to noise ratio equal to about 7.0 dB with differential demodulation and equal to 5.5 dB for coherent demodulation, in a 27 MHz wide channel.

It is an object of the invention to propose to provide a method of coherent demodulation (of the type according to which the carrier frequency is recovered by squaring the carrier and selecting the carrier frequency in the resulting spectrum, which has a greater immunity to noise than the prior art methods of differential demodulation and offers increased operating reliability as regards carrier recovery.

Before describing the invention, it may be useful to recall the operating principle of coherent demodulators.

If it is assumed that the modulated carrier 10 is transmitted as bursts of duration $T_N$ with a repeat period $T_L$, the carrier can be written:

$$x(t) = u(t) \cdot s(t)$$

where u(t) is a periodic signal whose shape is as shown in FIG. 2, of period $T_L$, such that:

$$u(t) = 1 \text{ for } t \in [0, T_N]$$

$$u(t) = 0 \text{ for } t \notin [0, T_N].$$

In the case of PSK-2 demodulation (also known as MDP-2) with two phase states, s(t) may be written:

$$s(t) = A \Sigma a_K r(t - kT) \cdot \cos(2\pi f_o t + \psi_o)$$

with:

$a_k = \pm 1$ according to the transmitted bit
A: amplitude of the carrier
$f_o$: frequency of the carrier
$\psi_o$: origin phase
r(t): wave shape of the symbol transmitted
T: duration of a bit.

In the case of the modulation of PSK 2-4 or MSK type, s(t) has the general form:

$$s(t) = A \Sigma a_K r(t - KT) \cdot \cos(2\pi f_o T + \psi_o - K\pi/2).$$

Coherent demodulation can be carried out by multiplication of the modulated signal and the recovered carrier, whose frequency is $f_o$ in the case of an PSK-2 modulation and $(f_o - \frac{1}{4}T)$ in the case of an PSK 2-4 or MSK (minimum shift keying) modulation.

This demodulation may be effected by a circuit of the type shown in FIG. 3 receiving the modulated carrier and comprising a band-pass filter 12 whose output is connected to a multiplier 14 and to a carrier recovery circuit 16. The output of the circuit 16 is applied to the second input of the multiplier and the output of the latter is applied to a band-pass filter 18 whose output S provides the demodulated signal. Circuit 16 uses conventionally the mode of recovery of the carrier of a two states modulated signal by squaring this carrier (for example by means of an analog multiplier 18), extracting the component of the output signal at a frequency close to a value $2f_1$ which is a function of $f_o$ with the filter and, finally, dividing by 2 in a divider 22.

The signal obtained at the output of the multiplier 18 contains a component, around frequency $2f_1$, which may be written:

$$y(t) = Bu(t) \cdot \cos(2\omega_1 t + 2\psi_o)$$

with:

$$\omega_1 = 2\pi f_1$$

and $\begin{cases} f_1 = f_0 \text{ in PSK-2 modulation} \\ f_1 = f_0 - \frac{1}{4}T \text{ for PSK 2-4 or MSK.} \end{cases}$ The transmission signal of the bursts u(t) can be decomposed into Fourier series and written:

$$u(t) = a_0 + \sum_{n=1}^{\infty} C_n \cos\left( n \frac{2\pi T}{T_L} - \phi_n \right)$$

As a result, signal y(t) consists of a sum of sine shaped signals of frequencies $2f_1 \pm n/T_L$ $$y(t) = B\left\{ a_0 \cos(2\omega_1 t + 2\phi_0) + \Sigma a_n \left[ \cos\left( 2\omega_1 t - \frac{2\pi n t}{T_L} \right) + \cos\left( 2\omega_1 t + \frac{2\pi n t}{T_L} \right) \right] \right\}$$

with: $a_0 = c_0 = T_N/T_L$ $$a_n = c_n/2 = \frac{\sin(n\pi(T_N/T_L))}{n\pi}$$

$$\phi_n = n\pi(T_N/T_L)$$

However it is observed that, in the usual case where $T_N$ is very much lesser than $T_L$, there are several signals which have amplitudes of the same order of magnitude. For example, with $T_N = 1$ μsec and $T_L = 64$ μsec:

| n | 0 | 1 | 2 | 3 | 4 |
|---|---|---|---|---|---|
| $a_n$ | 0.156 | 0.150 | 0.132 | 0.105 | 0.074 |

In the embodiment of FIG. 3, the component at frequency $2f_1$ is selected with a filter which must have a narrow band whose width is less than $1/T_L$. Such a band width may be obtained with a crystal driven filter. However, in general, and particularly in satellite broadcasting, the frequency of the modulated carrier applied to the input of the recovery circuit 16 has an accuracy less than $1/T_L$. This may result into selection of a frequency line $f_o \pm n/T_L$, with $n \neq 0$, which results in considerable phase error on demodulation.

The invention overcomes the drawback. In the method according to the invention, an acquisition burst having the carrier frequency, is transmitted at intervals separated by a period ($T_T$) longer by at least one order of magnitude than the period of transmission of successive modulated carrier bursts, and the acquisition burst is subjected to the carrier extraction process so as to identify the useful line in the spectrum.

The amplitude of the output signal of narrow band pass filter 20 (FIG. 3) increases with the duration of the acquisition burst, as consequently does the ratio between the amplitude of the useful line and the amplitude of a possible interferring line. The use of an acquisition burst of duration $T_S$ greater than the duration $T_N$ of each useful burst of frequency $f_1$ enables a much higher ratio to be obtained between the amplitude of the useful line and the amplitude of an interferring line, due to the fact that the amplitude of the output signal from the narrow band pass filter 20 increases with the duration of the burst.

Transmission of the acquisition burst will be controlled by a periodical signal v(t) of period $T_t$, having the shape shown in FIG. 4 and which may be written:

$v(t) = 1$ for $t \in [O, T_S]$ $v(t) = 0$ for $t$ $[O, T_S]$ with:

$T_T \gg T_L$ $T_S = T_L - T_N$.

When used for satellite broadcasting, the acquisition signal v(t) is transmitted during one line of frame blanking and the durations of the various signals transmitted can then be:

$T_N = 10$ μs $T_L = 64$ μs $T_S = 54$ μs $T_T = 20$ ms.

The burst must correspond to transmission of frequency $f_1$ and may hence be constituted by a sequence of bits at zero level.

The signal around frequency $2f_1$ obtained after squaring the modulated carrier by a circuit 18 is:

$$y_1(t) = B[u(t) + v(t)]\cos(2\omega_1 t + 2\phi_1)$$

or:

$$y_1(t) = B[a_0 + V(t)]\cos(2\omega_1 t + 2\phi) +$$

$$B \sum_{n=1}^{\infty} a_n \left[ \cos\left( 2\omega_1 t + 2\phi_1 - \frac{2\pi n t}{T_L} + \phi_n \right) + \cos\left( 2\omega_1 t + 2\phi_1 + \frac{2\pi n t}{T_L} - \phi_n \right) \right]$$

The latter formula shows that the component at frequency $2f_1$, and it alone, is amplitude modulated by signal v(t). Modulation enables $f_1$ to be identified and the ambiguity on carrier recovery from subsequent useful bursts to be lifted.

Before explaining particular embodiments which enable this modulation to be used to lift the ambiguity on $f_1$, it is appropriate to indicate the action on a signal $y_1$ of a rectangular filter of central frequency $f_c$, with a narrow band W such as $1/T_L > W \gg 1/T_T$ (crystal filter, for example).

The transfer function H(ν) of this filter has the expression:

$$H(\nu) = \begin{cases} 1 & \text{for } f_c - \frac{W}{2} < \nu < f_c + \frac{W}{2} \\ 0 & \text{elsewhere} \end{cases}$$

In the case, which is that desired for the filter 20 in FIG. 3, where one has $f_c = 2f_1$, the signal $y_2(t)$ at the output of the filter has the expression:

$$y_2(t) = B[a_o + V_s(t)] \cos(2\omega_1 t + 2\phi_1)$$

With:

$$V_s(t) \neq W T_s \Sigma \frac{\sin \pi W(t - kT_T)}{\pi W(t - kT_T)}$$

It is seen that the amplitude of $y_2(t)$ is maximum for $t = K \cdot T_T$ and has the value $v_{max} = B[a_o + WT_s]$.

If, on the contrary, $f_c=2f_1\pm n/T_L$ with $n\neq 0$ (i.e. if there was an error in the selection of the line), the amplitude of the signal $y_2(t)$ has the value $V_s=Ba_n$.

For satellite broadcast according to European standards:

$$\frac{1}{T_L} = 15625 \text{ Hz and } \frac{1}{T_T} = 50 \text{ Hz}$$

than it will be possible to accept the following values:

| Useful burst: | $T_N$ = 10 μsec. |
|---|---|
| Acquisition burst: | $T_s$ = 54 μsec. |
| Band Width: | W = 10 kHz. |

Which leads to:

$a_0+WT_s=0.696$ $a_1=0.150$ $a_2=0.132$.

It is found that, for all values of t which are multiples of $kT_T$, the amplitude of the frequency component $2f_1$ is higher by 13 dB than that of the other components, at frequencies $2f_1\pm n/T_L$. It is then easy, even in the presence of noise, to identify this line by an amplitude detection followed by a comparison to a threshold and to acquire the identified line.

In this case, the line at frequency $(2f_1)$ is easily identifiable as that having a maximum amplitude higher than a predetermined threshold.

In a particular embodiment of the invention, the useful bursts and acquisition bursts are squared and are mixed with the output signal of a voltage controlled variable frequency oscillator after it has also been squared, and the control voltage of the oscillator is modified progressively until the amplitude of the signal derived from mixing and subjected to narrow band pass filtering exceeds a predetermined threshold. The frequency modification of the oscillator can be done in steps substantially equal to the filtering band width.

It is also an object of the invention to provide a device for coherent demodulation of a carrier digitally modulated by phase shift or frequency shift with phase continuity, which carrier is transmitted as useful bursts spaced regularly in time, with phase continuity from one burst to the next. In an advantageous embodiment, the device comprises means for squaring the modulated frequency $(f_1)$ carrier to cause the appearance of frequency $(2f_1)$, a narrow band pass frequency isolating filter and a divider of frequency by two. The device further comprises means for shifting, before application to the narrow band pass filter, the double frequency $(2f_1)$ of the carrier frequency by an adjustable amount $(2f_1-f_c)$, means for comparing the amplitude of the output signal of the filter with a threshold and modifying the frequency shift until the amplitude exceeds the threshold and then locking the frequency shift.

The invention will be better understood from the following description of particular embodiments given by way of examples.

SHORT DESCRIPTION OF THE DRAWINGS

FIGS. 1, 2 and 3, already mentioned, are respectively: a map of the satellite broadcasting multiplex comprising an analog carrier frequency modulated by the image signal and a digital carrier sent during the blanking periods; a map showing the bursts of modulated carrier; and a block diagram of a conventional coherent demodulation circuit;

Figure 5:
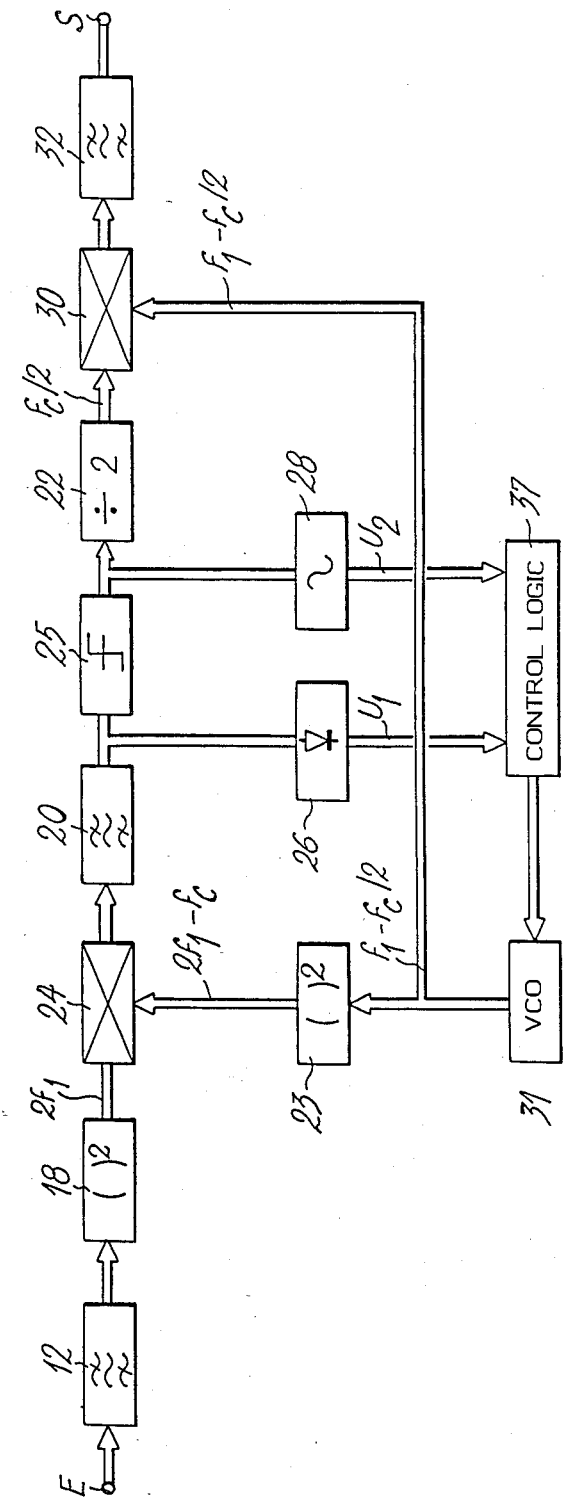
FIG. 5 is a block diagram of a carrier recovery circuit comprising a narrow band pass filter, constituting a first embodiment of the invention.
Figure 9:
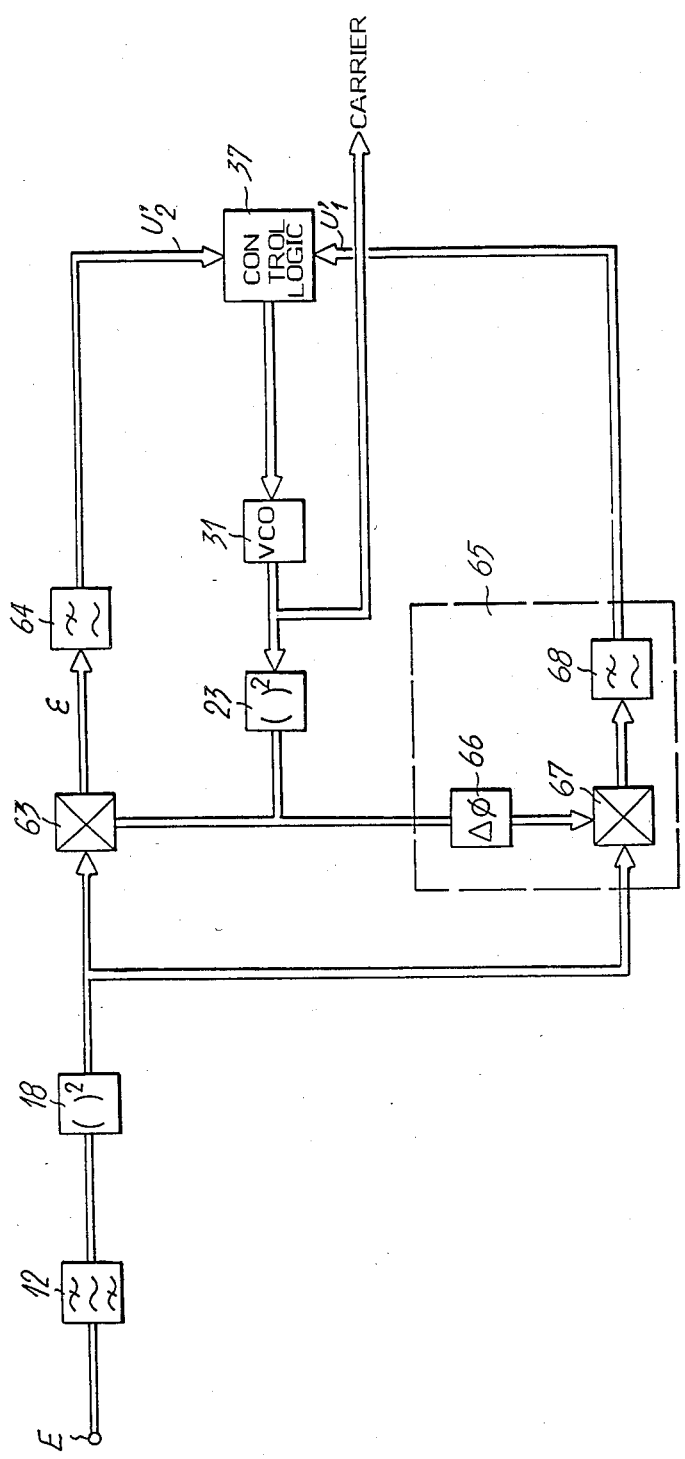

FIG. 9, similar to FIG. 5, is a diagram of a carrier recovery circuit with a phase lock loop, constituting another embodiment of the invention.

DESCRIPTION OF PARTICULAR EMBODIMENTS

Figure 1:
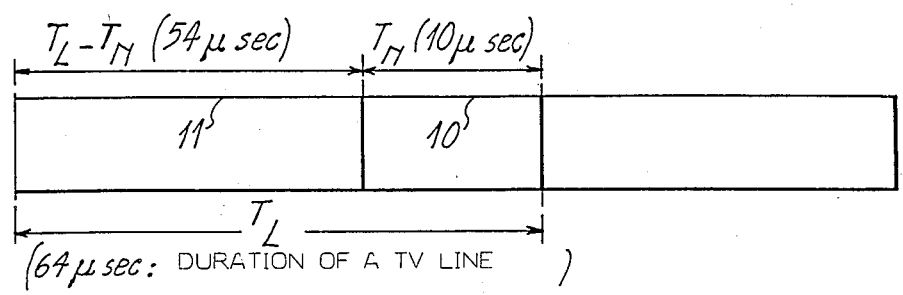
Figure 2:
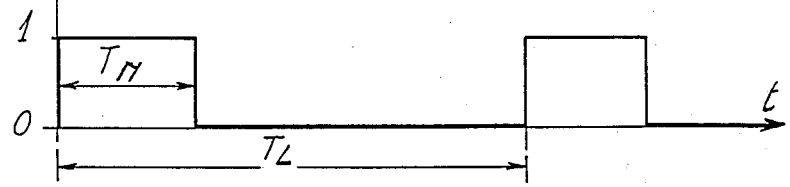
Figure 3:
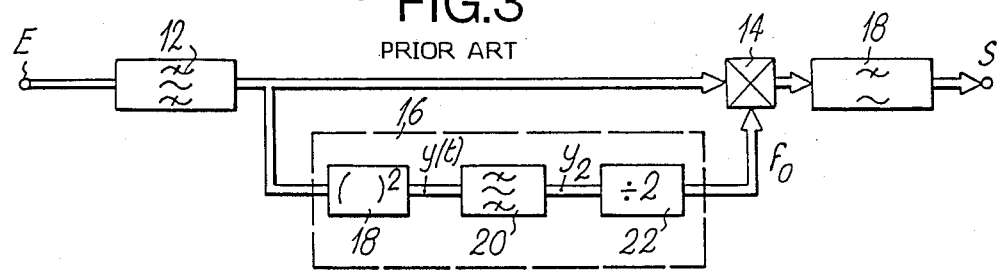
Figure 4:
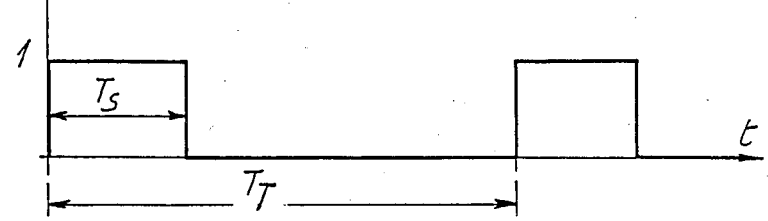
FIG. 4 is a diagram showing the location of an acquisition burst of duration $T_S$ during broadcast.

Referring to FIG. 5, a carrier recovery circuit comprises a narrow band pass filter, which will typically be constituted by a crystal filter. This circuit, like that of FIG. 3, comprises an input band pass filter 12, followed by a squaring circuit 18 for squaring the modulated carrier signal that it receives, so as to cause appearance of frequency $2f_1$ in its output signal $y_1$. A first multiplier 24 is located between the squaring circuit 18 and filter 20 having a central frequency $f_c$. The multiplier 24 also receives a signal at frequency $(2f_1-f_c)$ provided by a second squaring circuit 23, constituting the last element of an acquisition loop which will be described below.

The output signal $f_c$ from the first multiplier 24 passes through the filter 20 and is applied to a limiter 25, then to a frequency divider 22 which delivers $f_c/2$ and applies it to a second multiplier 30 which receives from the acquisition loop the frequency signal $f_1-f_c/2$.

A filter 32 eliminates the frequency component $(f_1-f_c/2)$ accompanying signal $f_1$ at the output of the multiplier 30 and provides at the output a signal at the desired frequency $f_1$.

The acquisition loop includes a control logic 37 which develops a control signal for a voltage controlled oscillator 31 providing frequency $f_1-f_c/2$ from:

the output voltage $U_1$ of an amplitude detector 26, to which is applied the signal from the narrow band pass filter 20, the error voltage $U_2$ developed by a discriminator 28 (generally a crystal discriminator) which receives the output signal of limiter 25.

The oscillator 31 drives the second multiplier 30 directly and, through the squaring circuit 23, the first multiplier 24.

The role of the control logic is to provide a voltage for varying the frequency of the oscillator during the acquisition, in a range corresponding to the maximum variation in frequency of the modulated carrier: when the acquisition has taken place, that is when the ambiguity has been lifted, the sweep is stopped and the circuit provides the servo-coupling voltage enabling the useful signal to remain centered in the crystal filter.

Figure 6:
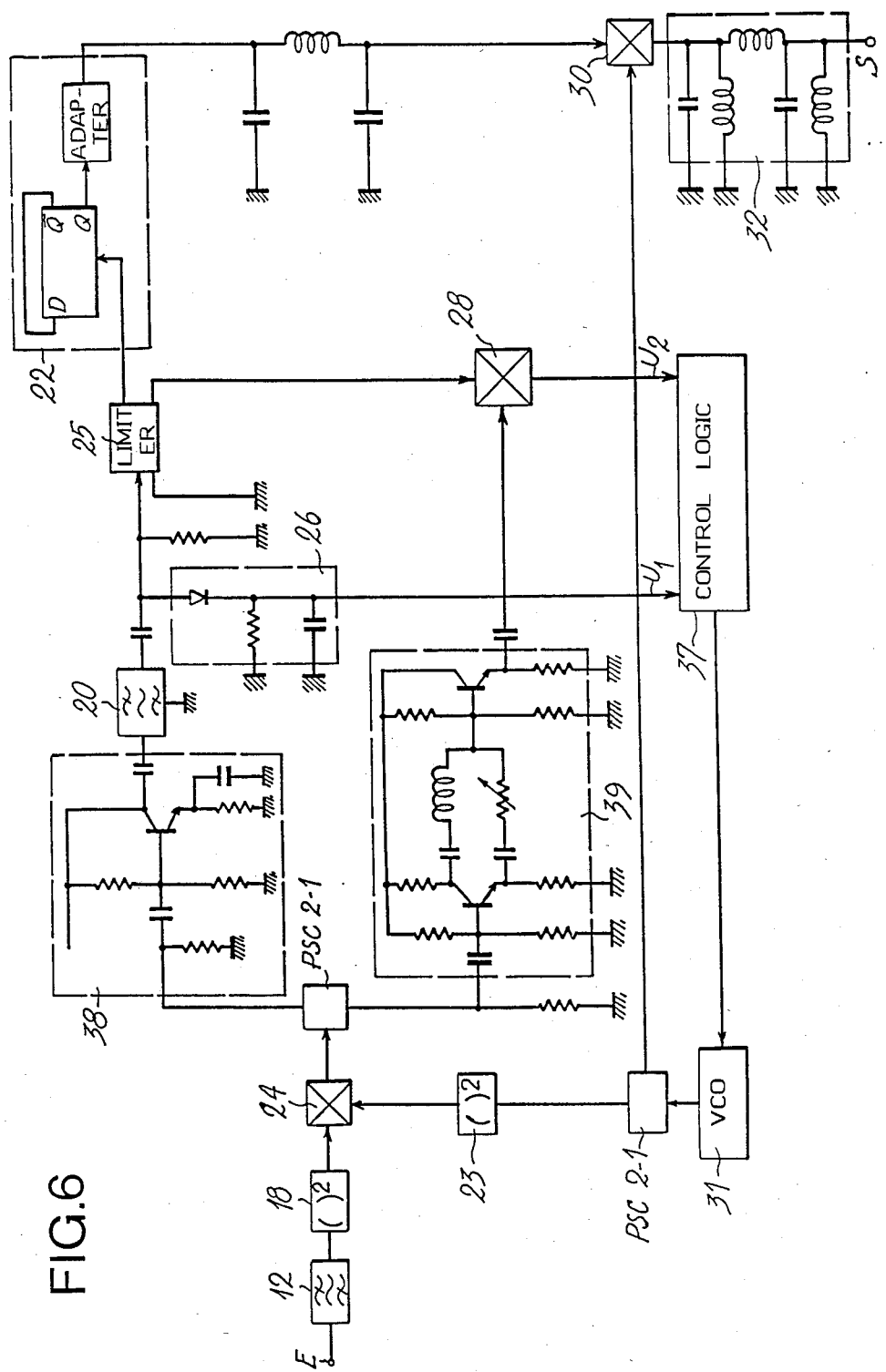
FIG. 6 is a block diagram illustrating the construction of some components of the diagram of FIG. 5.

FIG. 6, where the components corresponding to those of FIG. 5 are denoted by the same reference number, shows a possible arrangement of some of the components. The circuit 18 for squaring the modulated signal and the circuit 23 for squaring the signal from the oscillator 31 can comprise RK3 frequency doublers followed by a OM 350 amplifier intended to compensate the losses of insertion of the doubler. The narrow band pass filter 20 may be constituted by a monolithic crystal filter with four poles, of central frequency $f_c = 21.4$ MHz, and of band width at $-3$ db equal to 7.5 Hz. In FIG. 6, filter 20 is preceded by an amplifier 38 with an impedance adaptation transistor circuit. The limiter 25 may be a NE 529 circuit marketed by RTC. The divider 22 may be a type D flip-flop followed by an impedance adapter. It can be a SN 74 LS 74 flip-flop followed by an impedance adapter SN 74 128.

The frequency discriminator 28 can be constituted by a SBL 1 ring modulator forming the product of the signal upstream of the narrow band filter 20 and the output signal of the limiter 25 and the signal power is distributed between two branches by a power divider, which may be of the type PSC 2-1 available from the firm MCB and is designated PSC2-1 in FIG. 6. A similar power distributor, also designated PSC2-1, receives the output of oscillator 31 and feeds circuit 23 and 30. The signal upstream of the limiter 25 is taken up before amplifier 38. Before being applied to the frequency discriminator 28, it passes through an adjustable phase shifter 39 including two transistors, making it possible to adjust the phase in order that the output voltage be equal to zero at the central frequency $f_c$ of the crystal filter.

The control logic 37 may have any construction enabling it to fulfil the above-defined role. It can particularly be in accordance with the block diagram shown in FIG. 7.

Figure 7:
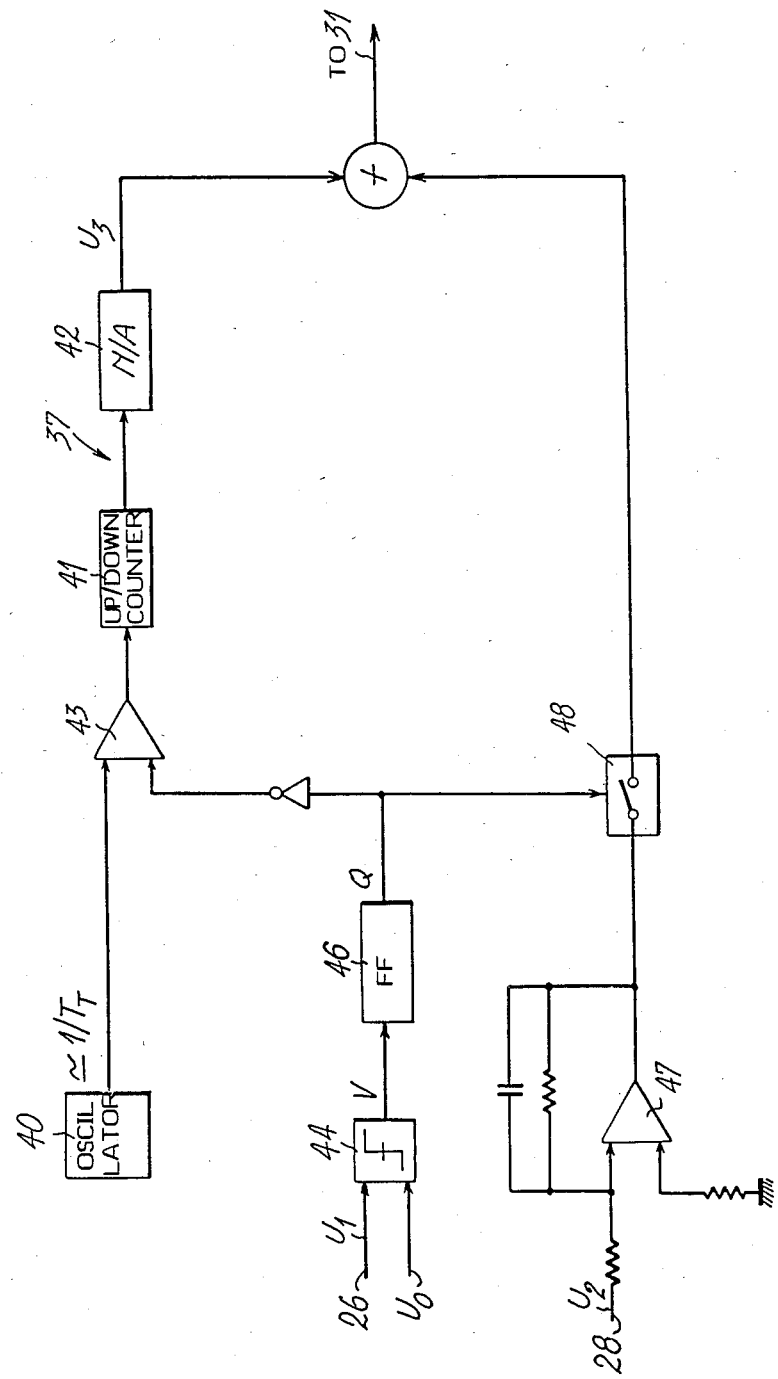
FIG. 7 is a representation of an embodiment of the logic control circuit of FIG. 5.

Referring to FIG. 7, the control logic 37 comprises a fixed frequency oscillator 40, which provides a square signal of frequency not adjustable approximately equal to $1/T_T$, which is applied to an up/down counter 41 and a D/A converter 42 which delivers a signal formed by a sequence of voltage steps such that each voltage step $\Delta U$ corresponds to a frequency jump of about W (W being the band width of the crystal filter 20). A AND logic circuit 43 between the oscillator 40 and the counter 41 constitutes a gate which stops the sweep when acquisition has taken place.

The signal $U_1$ obtained at the output of the amplitude detector 26 (FIGS. 5 and 6) is applied to a comparator 44 which delivers a logic level V such that:

$V = 0$ if $u_1 < u_0$ $V = 1$ if $u_1 > u_0$ $u_0$ being a reference voltage applied to the input of the comparator.

The condition $u_1 > u_0$ indicates acquisition and reveals that the useful reference signal $f_1$ has been obtained at the output of the carrier recovery circuit.

The logic signal at the output of the comparator 44 is constituted by a sequence of pulses of period $T_T$ and of duration approximately equal to $T_s$. It is applied to a retriggerable monostable flip-flop 46 which acts as a hold circuit and delivers a constant level $Q = 1$ when the sequence of pulses is present at the input. The time constant $\tau$ of the monostable is selected equal to some periods $T_T$ of the input signal. For example, with $\tau = 3T_T$, three successive non recognitions of the acquisition signal are necessary in order that the level be again $Q = 0$ and that the acquisition process be again triggered.

The voltage $U_2$ coming from the crystal frequency discriminator 28 is filtered and amplified in an analog filter 47 before being applied to an analog switch 48 whose control is provided by the monostable 46 (the switch being conducting if $Q = 1$).

The operation of the circuit is as follows:

if $u_1 < u_0$, $\forall t$, acquisition has not taken place. Then $Q = 0$. The switch 48 is blocked (that is corresponds to an open circuit). The frequency of the voltage controlled oscillator 31 is increased by an amount $\Delta F \simeq W$ at each period of the sweep oscillator, from an initial value which can be selected less than the expected value of $f_1 - f_c/2$. If the counter reaches its maximum capacity without acquisition taking place, it starts to count down. In an other embodiment, it returns simply to zero.

if $u_1 > u_0$ for $t = kT_T$, acquisition took place and $Q = 1$. Scanning is stopped, the switch 48 is rendered conducting and the servocoupling voltage $U_2$ is kept applied to the voltage controlled oscillator.

By way of example, there will now be described, with reference to FIG. 8, the general construction of a receiver of satellite broadcast in system C incorporating a recovery circuit of the type shown in FIGS. 5 and 6.

The receiver comprises an input mixer 50 for transposition of the input signal received at the first intermediate frequency (around 1 GHz) transposed to a second lower frequency (around 100 MHz for example), by multiplication with the signal of a local oscillator tuned to select the desired channel.

The signal at the output of the mixer 50 is filtered by a low band pass filter 52 and is applied to an amplifier 53 provided with automatic gain control. The constant amplitude obtained at the output of the amplifier 33 is divided into two channels.

One of the channels is subjected to treatment of the image signal and to frame synchronization. Being of the well-known type, this treatment will not be described in detail and it will suffice to recall that the treatment channel carries out the following functions:

channel filtering (analogue filter 54 in FIG. 8), frequency demodulation (analogue FM demodulator 55), amplification and filtering of the demodulated image signal (filter 56), clock recovery, frame synchronization and creation of the time base (processing unit 57 for analogue and digital signals).

The other channel at the output of the amplifier 53 insures coherent demodulation of the digital signal. It comprises an input band pass filter 12, followed by a switch 58 shown in the form of a mechanical element for simplification. When the frame synchronizing word has been recognized by the processing unit 57, the time base generates a signal controlling the switch 58 which enables the signal to be applied to the digital demodulator only during the duration of the digital bursts.

Filter 12 can be a filter of the Gaussian type up to $-6$ dB with three poles so selected that $B = 0.65$ T (B being the band width at $-3$ dB of the filter). The signal from the filter is divided into two channels.

One of the channels is connected to the carrier recovery circuit 60, of the type shown in FIGS. 5 and 6, which delivers the recovered carrier at frequency $f_0 - \frac{1}{4}T$. In this case, the oscillator 31 of the carrier recovery circuit has a constant frequency (crystal oscillator) and the error voltage $U_4$ at the output of the logic control circuit 37 is applied to the local transposition oscillator 51 after it has been added in a summing circuit 61 to the channel selection signal provided by an adjustable selection unit 62.

The other output channel from the filter 12 comprises a mixer 63 which receives on its second input the recovered carrier and whose output delivers, after low pass filtering at 64, the demodulated digital signal.

Figure 8:
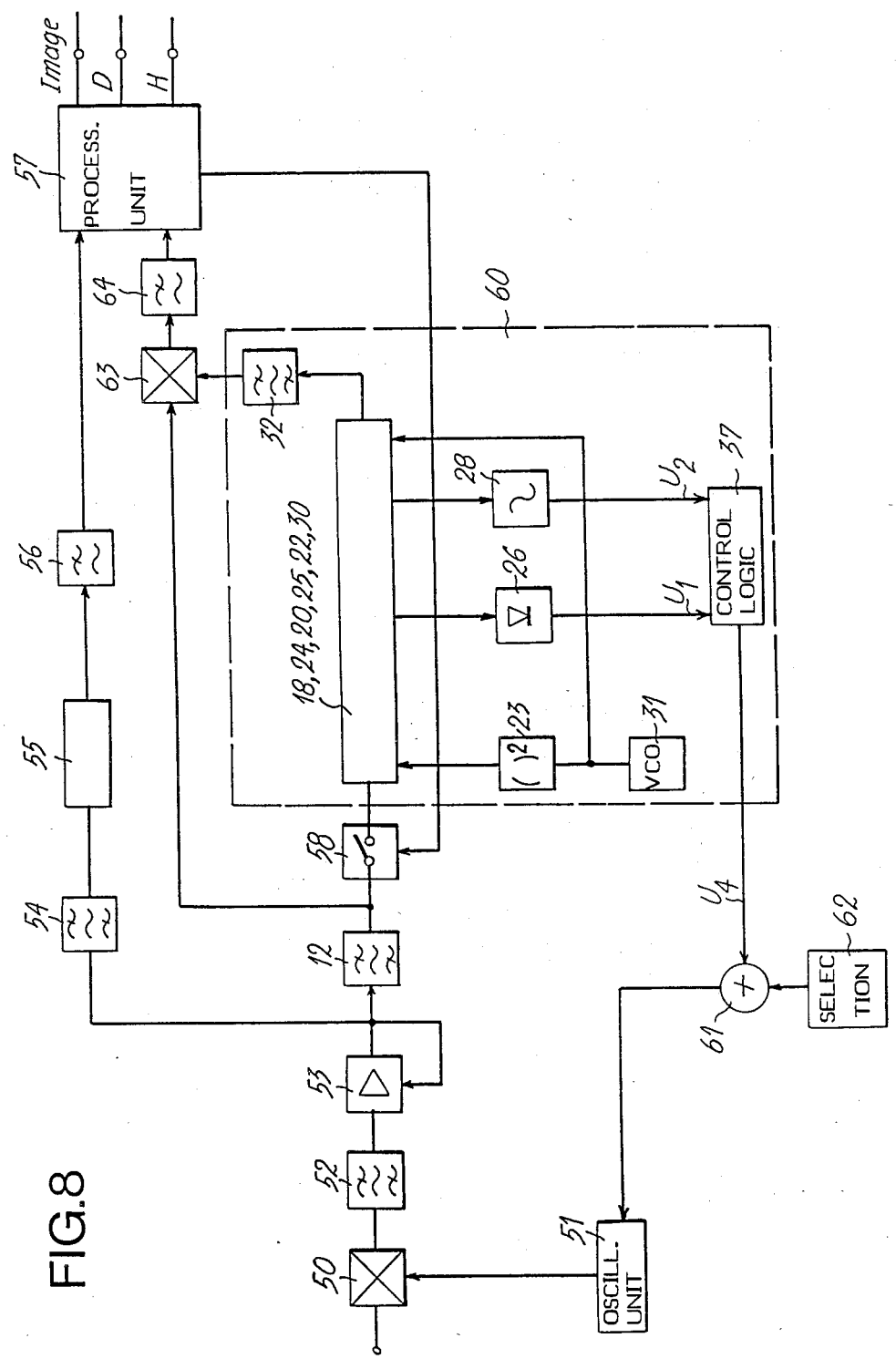
FIG. 8 is a block diagram of the general design of a receiver for C-MAC satellite broadcasting in which the carrier recovery circuit of FIG. 5 may be used.

There will now be briefly described operation of the carrier recovery circuit, if implemented in a broadcast receiver of the type shown in FIG. 8.

After the receiver is turned on, the user preselects the frequency of the local oscillator 51 for operation on the desired broadcasting channel, by means of a selection member 62. The logic control circuit 37 will then vary the frequency of the oscillator 51, if necessary, on each side of the preselected frequency. The acquisition is done in two steps.

During the first step, the frame synchronization word should be identified by the processing unit 57. When this synchronization word has been recognized, the time base of unit 57 generates a signal which is applied to the switch 58 to render it conducting. The bursts of digital data are then sent to the carrier recovery circuit.

During the second step, there is identification of the carrier acquisition signal by the circuit 60; for that purpose, that line or peak which is amplitude modulated is identified. Frequency scanning continues until the carrier acquisition signal has been recognized. As soon as recognition is effective, frequency scanning is stopped by actuation of the switch 58 and energization of the automatic frequency control (AFC) circuit. The receiver is then in steady operation and provides the digital data at a rate of 20.25 Mbits per second to the processing circuit.

In the modified embodiment of FIG. 9, where the components corresponding to those of FIG. 5 are designated by the same reference numeral, carrier recovery is carried out by a phase lock loop.

Referring to FIG. 9, the VCO 31 has a rest frequency close to $f_1$. The output signal of the oscillator 31 is applied to a squaring circuit 23 which generates a component carrier at frequency $2f_1$ which is applied to one of the inputs of a phase comparator 63 which is substituted for the multiplier 24 of FIG. 5. The other input of the phase comparator 63 receives the modulated digital carrier after squaring by the circuit 18.

The output voltage $\epsilon$ of the phase comparator 63 (whose amplitude is proportional to the phase difference of the input signals) is applied to a low pass filter 64 whose output voltage $U'_2$ constitutes the error voltage applied to the control logic 37 to enable phase servocoupling of the oscillator signal during the acquisition step.

The acquisition detection circuit 65 then consists of a phase shifter 66, a phase comparator 67 and a low pass filter 68 whose band pass W must be such that:

$$\frac{1}{T_T} < < W < \frac{1}{T_L}$$

The phase comparator 67 is used as a synchronous amplitude detector. In the case where the frequency difference between the modulated carrier and the carrier issuing from the oscillator 31 is less than $1/T_L$, the signal $u'_1$ obtained at the output of the filter 68 is formed from a sequence of pulses of period $T_T$.

The signals $u'_1$ and $u'_2$ are applied to the logic control circuit 37 which provides the control voltage of the oscillator and can be as shown in FIG. 8.

When acquisition has taken place, the voltage $u'_2$ is applied to the input of the oscillator 31 which is then servocoupled in phase with the modulated carrier, the phase difference being equal to $\pi/2$. The phase shifter 66 providing a $\pi/2$ phase shift is hence necessary to obtain, at the output of the phase comparator 67, a maximum voltage when acquisition has taken place: the carrier frequency recovered is provided by oscillator 31.

In all cases, the device removes ambiguity by shifting the carrier frequency. Such shift is achieved by mixing the carrier with a signal at adjustable frequency provided by a local oscillator, so that the central line of the resulting frequency corresponds to the band pass of the filter which hence isolates the carrier frequency. During an acquisition phase, the frequency of the local oscillator is gradually modified, generally by steps substantially equal to the band width of the filter, until the maximum amplitude at the output of the narrow band pass filter exceeds a predetermined threshold, selected to be intermediate between the value of the central line of the acquisition burst (selected by the filter) and that corresponding to selection of a side line by the filter. Once acquisition has occured, the frequency of the local oscillator is preserved and the carrier recovery is effected on the useful bursts, as in a conventional device.

I claim:

1. A method of coherent demodulation of a digitally modulated carrier modulated by phase shift keying or frequency shift keying with phase continuity, said carrier being transmitted as useful bursts distributed at equal time intervals with phase continuity from each burst to the next burst, said process including the steps of recovering the frequency of said carrier by squaring said carrier for obtaining a spectrum and selecting the carrier frequency within said spectrum, wherein an acquisition burst having the same frequency as said carrier, having a time duration longer than the time duration of said useful bursts and having characteristic features which are particular to said acquisition burst, is also sent at times which are separated by time periods having a duration which is longer than the repetition period of the useful bursts by at least an order of magnitude, wherein said acquisition burst is received along with the useful bursts, is squared to provide an acquisition spectrum and a frequency which is double that of the carrier frequency is selected within an acquisition period by identifying said characteristic features of the acquisition burst.

2. Method according to claim 1, wherein said acquisition burst consists of a sequence of bits of O level and a line at said frequency double of the carrier frequency is identified as having a maximum amplitude which is higher than a predetermined threshold.

3. Method according to claim 2, wherein said useful bursts and acquisition bursts are squared and are mixed with the squared output signal of a voltage controlled variable frequency oscillator, and a signal originating from said mixing is subjected to narrow band filtering and the amplitude of the signal from said narrow band filtering is compared with a predetermined threshold and the voltage for controlling said oscillator is progressively modified until said predetermined threshold is exceeded.

4. Method according to claim 3, wherein the controlling voltage is modified by steps so dimensioned that the oscillator frequency is modified by steps substantially equal to the band width of the narrow band filtering.

5. Method according to claim 1 for recovery of the carrier within a satellite broadcast signal consisting of a time multiplex of an analog carrier frequency modulated by an image signal during the active time duration of a TV line and a digital carrier sent during each line blank signal, wherein one acquisition burst is sent during one line of the frame blanking.

6. A coherent demodulation device for carrying out a method according to claim 1, comprising means for squaring said frequency modulated carrier for frequency doubling, a narrow band filter connected to said squaring means and having a narrow band for segregating said double frequency and means for halving said double frequency, further comprising means for shifting said double frequency by an adjustable amount before it is applied to said narrow band filter, means for comparing the amplitude of the output signal of said filter with a threshold, means for modifying the amount of frequency shift until the amplitude exceeds said threshold and for locking the amount of offset upon occurence of that condition.

7. Device according to claim 6, wherein said means for comparing the amplitude to a predetermined threshold and for controlling variation of the amount of offset comprises amplitude detector means connected to receive the output of said narrow band filter, logic circuit means connected to receive the output of said amplitude detector means and arranged for delivering a variable voltage, an oscillator controlled by said variable voltage and connected to deliver a signal at a frequency representing said amount of offset for increasing said amount as long as said threshold is not exceeded.

8. Device according to claim 7, wherein said logic circuit means comprises comparator means for comparing said amplitude with a predetermined threshold, said comparator means having an output for actuating a circuit which progressively increases the control voltage of said oscillator as long as the threshold is not exceeded.

9. Device according to claim 8, wherein the output of said comparator means further controls switch means for summing said control voltage of said oscillator and a correction voltage delivered by a frequency discriminator and generated from a signal obtained through said narrow band filter and from an amplitude limiter.

10. A device for coherent demodulation of a digitally modulated carrier modulated by phase shift keying or frequency shift keying, said carrier being transmitted as useful bursts distributed at equal time intervals with phase continuity from each burst to the next burst, wherein acquisition bursts having the same frequency as said carrier, having a time duration longer than the time duration of said useful bursts and having characteristic features which are particular to said acquisition burst, are sent at times which are separated by time periods having a duration which is longer than the repetition period of the useful bursts by at least an order of magnitude, acquisition bursts being received along with the useful bursts, said device comprising means for squaring said modulated carrier for generating a signal at a frequency double from that of said carrier, means for shifting said signal at double frequency by an adjustable amount, a narrow band filter connected to receive the shifted signal and having a narrow band for segregating said double frequency, means for comparing the amplitude of the output signal of said filter with a threshold, means for modifying the amount of frequency shift until the amplitude exceeds said threshold and for locking the amount of offset upon occurence of that condition, and means for halving said double frequency.

* * * * *